(12) United States Patent
Nishimura et al.

(10) Patent No.: US 6,381,075 B2
(45) Date of Patent: Apr. 30, 2002

(54) BARRIER OPENING AND CLOSING APPARATUS

(75) Inventors: Syunji Nishimura, Omiya; Masaya Nozawa, deceased, late of Omiya, by Mieko Nozawa, legal representitive; Yukio Noguchi, Omiya, all of (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/820,797

(22) Filed: Mar. 30, 2001

(30) Foreign Application Priority Data

Mar. 31, 2000 (JP) ........................................ 2000-099687

(51) Int. Cl.[7] .............................................. G02B 15/14
(52) U.S. Cl. ........................ 359/700; 359/699; 359/701
(58) Field of Search ................................. 359/693–695, 359/699–706, 822–823, 829–830, 825–826; 396/448

(56) References Cited

U.S. PATENT DOCUMENTS 5,144,493 A    9/1992  Nomura ...................... 359/700
5,392,160 A  * 2/1995  Satoh et al. ................. 359/695
5,646,790 A  * 7/1997  Kohmoto et al. ........... 359/823
6,264,380 B1 * 7/2001  Omiya ........................ 396/448

FOREIGN PATENT DOCUMENTS

JP    5-080391     9/1991
JP    7-55546      12/1995
JP   10-186453     12/1996

* cited by examiner

Primary Examiner—Georgia Epps
Assistant Examiner—William Choi
(74) Attorney, Agent, or Firm—Leydig, Voit & Mayer, Ltd.

(57) ABSTRACT

A barrier opening and closing apparatus for opening and closing a barrier according to a rotation of a lens barrel containing an optical lens system includes a ring member rotatable about an optical axis of the optical lens system and opening and closing the barrier according to rotation of the ring member. The ring member has rotational force transmitting parts extending rearward, parallel to the optical axis and engaging the lens barrel. The ring member is directly rotated by the rotational force transmitting parts engaged with the lens barrel, to open and close the barrier so the cost of the apparatus can be reduced.

6 Claims, 6 Drawing Sheets

BARRIER OPENING AND CLOSING APPARATUS

BACKGROUND OF THE INVENTION

1. Field of the Invention

The present invention relates to a barrier opening and closing apparatus used in an optical system of an optical instrument such as a camera.

2. Related Background Art

Conventionally known as a barrier opening and closing apparatus used in an optical system of an optical instrument such as a camera is one comprising a lever disposed on the outer periphery side of a lens barrel so as to extend in the optical axis direction as disclosed in Japanese Patent Application Laid-Open No. HEI 5-80391 or No. HEI 10-186453. In such a barrier opening and closing apparatus, the lever is rotatably attached to the outer peripheral surface of the lens barrel, whereas a front end portion of the lever is engaged with a ring member, whereby the lever is rotated as the lens barrel rotates, so as to open the barrier by way of the ring member.

Also known is one comprising a driving ring for opening and closing a barrier, and a driving arm extending in the optical axis direction from the driving ring, in which a rotational force is applied to the driving arm by use of a cam mechanism, so as to open and close the barrier by way of the driving ring as disclosed in Japanese Utility Model Publication No. HEI 7-55546.

However, the former barrier opening and closing apparatus disclosed in Japanese Patent Application Laid-Open No. HEI 5-80391 or No. HEI 10-186453 necessitates a lever in addition to a ring member as a component of the apparatus, and it is necessary for the lever to be rotatably attached to the lens barrel in a process of making the apparatus. Therefore, if the barrier is to be opened and closed by use of a lever, then the cost of the lever as a component and the cost of attaching the lever upon manufacture will be necessary.

In the latter barrier opening and closing apparatus disclosed in Japanese Utility Model Publication No. HEI 7-55546, on the other hand, there is a fear of the driving ring failing to rotate smoothly, since there is only one driving arm for applying the rotational force to the driving ring. If the driving arm is formed longer, for example, then not only a force for rotating the ring but also a force for tilting it may apply thereto, so that there is a fear of the driving ring being prevented from rotating smoothly due to a frictional force between the driving ring and a member for holding the driving ring, whereby the barrier may not be opened and closed smoothly.

SUMMARY OF THE INVENTION

In order to overcome such problems, it is an object of the present invention to provide a barrier opening and closing apparatus which can lower the cost of apparatus and can smoothly open and close the barrier.

For achieving such an object, the present invention provides a barrier opening and closing apparatus for opening and closing a barrier according to an action of a lens barrel containing an optical lens system; the apparatus comprising a ring member disposed rotatable about an optical axis of the optical lens system and adapted to open and close the barrier according to a rotation thereof, the ring member forming a plurality of rotational force transmitting parts extending rearward therefrom in parallel to the optical axis, a rotational force for opening and closing the barrier being supplied according to the action of lens barrel by way of the rotational force transmitting parts.

The barrier opening and closing apparatus in accordance with the present invention may be configured such that the rotational force transmitting parts of the ring member are engaged with the lens barrel, and the rotational force is transmitted to the ring member by way of the rotational force transmitting parts as the lens barrel rotates.

In the barrier opening and closing apparatus in accordance with the present invention, the rotational force transmitting parts may be formed at substantially equal intervals peripherally of the ring member.

In the barrier opening and closing apparatus in accordance with the present invention, the rotational force transmitting parts may be engaged with the lens barrel at a rear end position thereof.

According to the present invention, a rotational force is directly transmitted to the ring member by way of the rotational force transmitting parts as the lens barrel rotates or moves. Since the rotational force of ring member is transmitted by a plurality of rotational force transmitting members, the ring member smoothly rotates without tilting as the rotational force is transmitted thereto. As a consequence, the barrier can be opened and closed smoothly.

The present invention will become more fully under stood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, an embodiment of the present invention will be explained with reference to the accompanying drawings. Among the drawings, constituents identical to each other will be referred to with numerals identical to each other without repeating their overlapping explanations. Also, the sizes and proportions in the drawings do not always match those explained.

Figure 1:
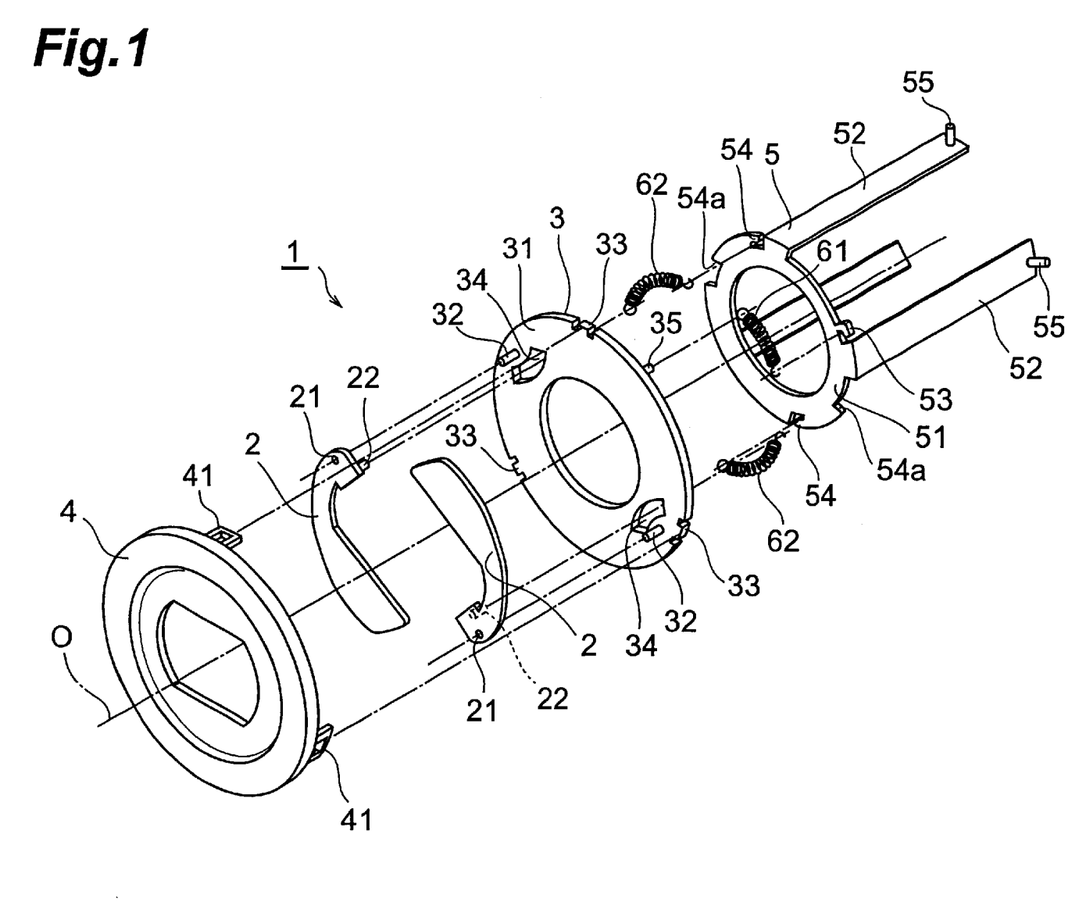
FIG. 1 is an explanatory view of the barrier opening and closing apparatus in accordance with an embodiment of the present invention.

FIG. 1 is an exploded perspective view of the barrier opening and closing apparatus in accordance with an embodiment of the present invention. As shown in FIG. 1, the barrier opening and closing apparatus 1 is used in a taking optical system of a camera, for example, and comprises barriers 2, 2 for opening and closing a front-end opening portion of the taking optical system. The barriers 2, 2 are disposed symmetrical about the optical axis O of the taking optical system and each are rotatably attached to a barrier body 3. For example, each barrier 2 is formed with a through hole 21 penetrating therethrough from one surface to the other, into which an axial pin 32 projecting from a surface 31 of the barrier body 3 is inserted. As a consequence, the barrier 2 is rotatable about the axial pin 32, by which the barrier is opened and closed.

The outer rim of the barrier body 3 is formed with engagement portions 33. The engagement portions 33 are used for engaging a front cover 4 attached to the barrier body 3 on the surface side thereof. Each engagement portion 33 is constituted by a lug formed by incising the outer rim of the barrier body 3, for example, and engages a pawl 41 of the front cover 4.

The barrier body 3 is formed with openings 34 disposed near the respective axial pins 32. Each opening 34 is a hole penetrating through the barrier body 3 from one surface to the other and allows a pin 22 projecting from the back face of the barrier 2 to penetrate therethrough.

A ring member 5 is disposed on the back side of the barrier body 3. The ring member 5 opens and closes the barrier 2 by rotating about the optical axis O and comprises a ring portion 51 which is shaped like a ring. The ring portion 51 is rotatably attached to the backside of the barrier body 3, and has an outer rim part formed with a first hook 53 and second hooks 54.

The first hook 53 is engaged with one end of a coil spring 61. The other end of the coil spring 61 is engaged with a pin 35 projecting from the backside of the barrier body 3. Due to the compressive force of coil spring 61, the ring member 5 is urged in a predetermined direction, e.g., in a counterclockwise direction about the optical axis O.

On the other hand, each second hook 54 is engaged with one end of a coil spring 62. The other end of the coil spring 62 is engaged with the pin 22 extending through the barrier body 3. If the ring member 5 rotates counterclockwise as being urged by the coil spring 61, then the other end face 54a of the hook-shaped portion of the second hook 54 abuts against the pin 22 and pushes the latter, whereby the barrier 2 is opened. If the ring member 5 rotates counterclockwise against the urging of the coil spring 61, by contrast, then the pin 22 is pulled due to the compressive force of coil spring 62, whereby the barrier 2 is elastically closed.

The outer rim part of the ring portion 51 of the ring member 5 is formed with rotational force transmitting parts 52. Each rotational force transmitting part is used for transmitting the rotational force from the lens barrel to the ring portion 51 and is integrally formed with the ring portion 51 as a band extending in parallel to the optical axis O rearward from the ring portion 51. The rotational force transmitting part 52 may have not only a band-like form but also a rod-like form or other forms.

Three pieces of rotational force transmitting parts 52 are formed at substantially equal intervals peripherally of the ring portion 51. For stably rotating the ring portion 51, it is desirable that at least two rotational force transmitting parts 52 be formed at equal intervals.

A projection 55 is disposed at a front end portion of each rotational force transmitting part 52 on the outer face side thereof. The projection 55 engages the lens barrel.

Figure 2:
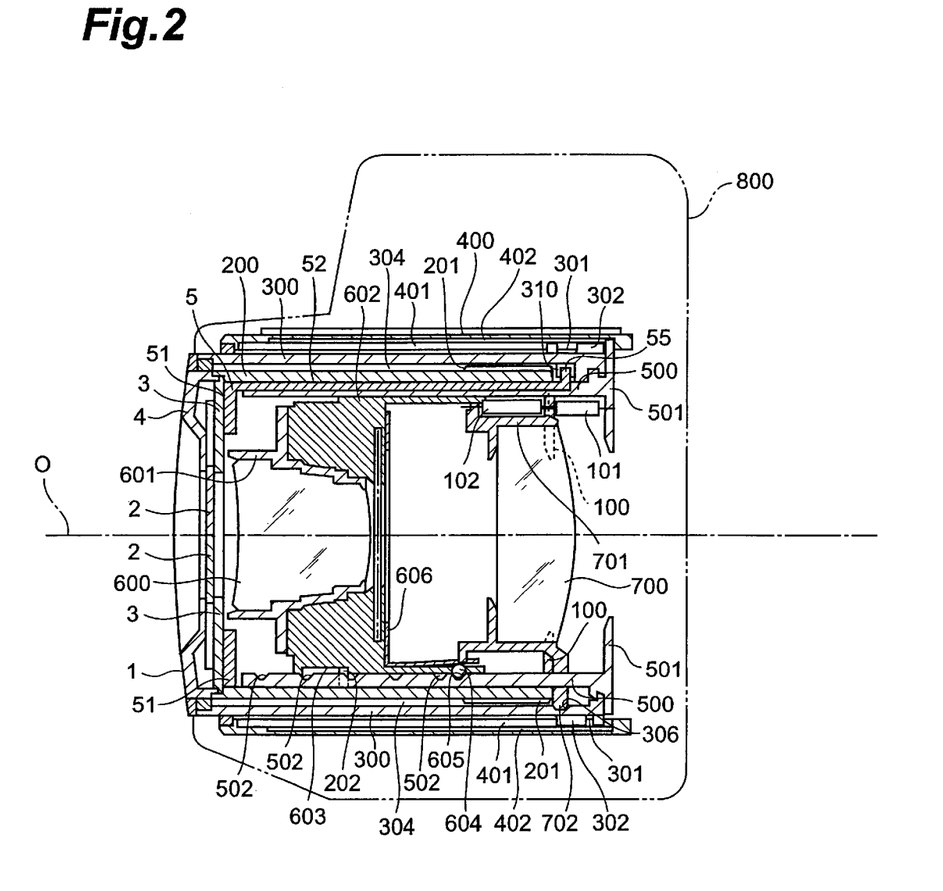
FIG. 2 is an explanatory view of a lens barrel incorporating therein the barrier opening and closing apparatus of FIG. 1.

FIG. 2 is a sectional view of a lens barrel incorporating the barrier opening and closing apparatus 1 therein.

As shown in FIG. 2, the barrier opening and closing apparatus 1 is used as being attached to a lens barrel comprising a movable barrel 200 and an intermediate barrel 300. Specifically, the barrier opening and closing apparatus 1 is installed such that the barriers 2, 2 are positioned at a front end portion of the movable barrel 200. The rotational force transmitting parts 52 of the ring member 5 are arranged along the inner peripheral surface of the movable barrel 200. The projection 55 formed at the front end of each rotational force transmitting part 52 abuts against a lug 310 formed at the inner peripheral surface of the intermediate barrel 300.

The movable barrel 200 and intermediate barrel 300 are arranged so as to be expandable from and collapsible into a camera body 800. The intermediate barrel 300 is a barrel which is open at both ends, and is contained in a fixed barrel 400 installed in the camera body 800. The outer peripheral surface of a rear portion of the intermediate barrel 300 is formed with helicoid threads 301 and teeth 302. For example, the helicoid threads 301 are formed as helical projections and recesses in the outer peripheral surface of the rear portion of the intermediate barrel 300, whereas a number of teeth 302 are formed along the outer periphery so as to be placed between the projections of helicoid threads 301.

The helicoid threads 301 are in mesh with helicoid threads 401 formed in the inner peripheral surface of the fixed barrel 400. The teeth 302 are in mesh with a driving gear installed in the camera body 800, which is not depicted. Consequently, as the driving gear rotates, the intermediate barrel 300 rotates about the optical axis O by way of the teeth 302. As the intermediate barrel 300 rotates, the intermediate barrel 300 moves along the optical axis O relative to the fixed barrel 400 since the helicoid threads 301 and 401 are in mesh.

The intermediate barrel 300 contains the movable barrel 200 therein. The movable barrel 200 is a barrel which is movable along the optical axis O as with the intermediate barrel 300, and is arranged concentric with the intermediate barrel 300 about the optical axis O. The outer peripheral surface of the rear portion of the movable barrel 200 is formed with helicoid threads 201 which are helical projections and recesses. The helicoid threads 201 are in mesh with helicoid threads 304 formed in the inner peripheral surface of the intermediate barrel 300.

The movable barrel 200 is engaged with a straight barrel 500, so as to be prevented from rotating about the optical axis O, while being allowed to move only linearly. Therefore, if the intermediate barrel 300 rotates, then the movable barrel 200 moves along the optical axis O relative to the intermediate barrel 300 since the helicoid threads 304 and 201 are in mesh.

The straight barrel 500 is a barrel disposed inside the movable barrel 200 and forms a key part 501 in a rear end portion thereof. The key portion 501 is engaged with a longitudinal groove 402 formed in the inner peripheral surface of the fixed barrel 400. As a consequence, the straight barrel 500 is prevented from rotating about the optical axis O and is allowed to move only linearly along the optical axis O.

The rear end portion of the straight barrel 500 is engaged with the intermediate barrel 300 while allowing the intermediate barrel 300 to rotate. Consequently, as the intermediate barrel 300 moves in the optical axis direction, the straight barrel 500 linearly moves without rotating.

A front lens group 600 and a rear lens group 700 are disposed inside the straight barrel 500. The front lens group 600 and rear lens group 700 are lens groups constituting an optical lens system.

The rear lens group 700 is attached to a rear group lens frame 701. The rear group lens frame 701 is engaged with the straight barrel 500 so as to be slidable in the optical axis direction. The rear group lens frame 701 forms cam followers 702 projecting outward from its side portion. The cam followers 702 penetrate through the straight barrel 500 and movable barrel 200, so as to be inserted into their corresponding cam grooves 306 formed in the inner peripheral surface of the intermediate barrel 300. Consequently, as the intermediate barrel 300 rotates or moves, the rear lens group 700 moves along the optical axis O while tracking the cam grooves 306. The cam grooves 306 will be explained later in detail.

The front lens group 600 is attached to a front group lens frame 601. The front group lens frame 601 is connected to a shutter unit 602 and is movable together with the shutter unit 602. The shutter unit 602 is attached to the straight barrel 500 so as to be slidable along the optical axis direction.

The side face of shutter unit 602 is formed with a groove 603 extending in the optical axis direction. Inserted into the groove 603 is a protrusion 202 projecting from the inner wall of movable barrel 200. As a consequence, the shutter unit 602 and front lens group 600 are movable relative to the movable barrel 200 by a distance corresponding to the forming length of the groove 603.

A click ball 604 is installed in the shutter unit 602. The click ball 604 is a ball for moving the front lens group 600 together with the intermediate barrel 300 and is installed within an installation hole 605 penetrating through a rear portion of the shutter unit 602. Also, a pressing member 606 is installed in the shutter unit 602. The pressing member 606 is an urging means for urging the click ball 604 outward.

The inner surface of straight barrel 500 is formed with recesses 502 for engaging the click ball 604. Here, a plurality of recesses 502 are formed at equal intervals along the optical axis direction.

Disposed inside the straight barrel 500 is a movable mask 100. The movable mask 100 is attached to the straight barrel 500 so as to be movable in the optical axis direction and is urged by a spring 101 toward the proximal end. Disposed between the movable mask 100 and rear group lens frame 701 is a spring 102 which urges the rear group lens frame 701 toward the proximal end.

Figure 3:
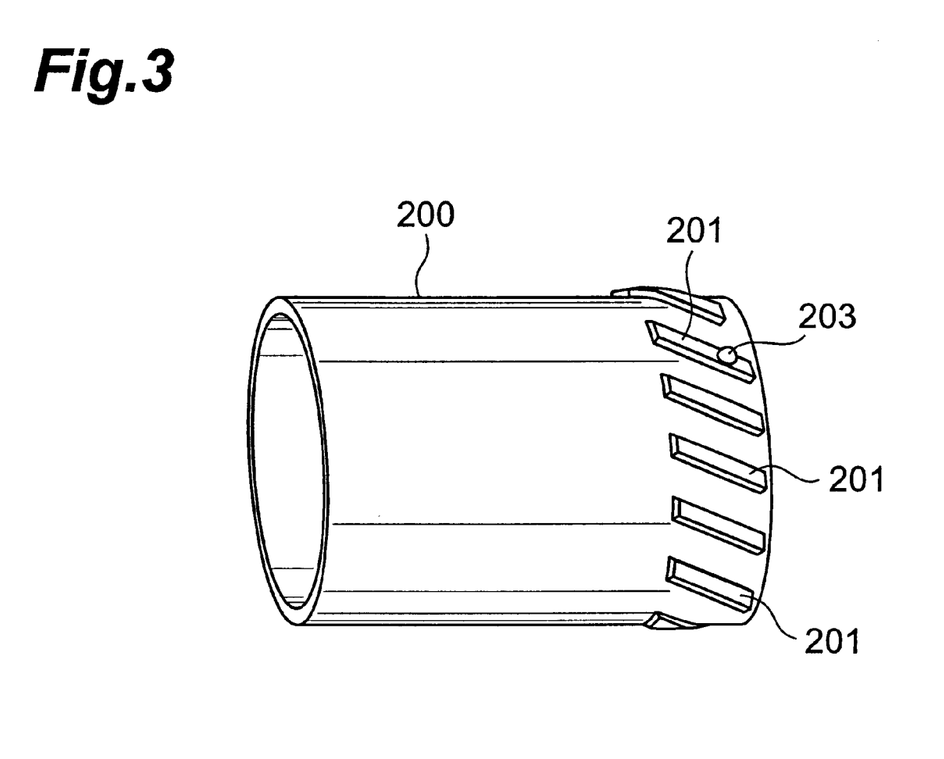
FIG. 3 is an explanatory view of the movable barrel in the lens barrel of FIG. 2.

FIG. 3 is a perspective view of the movable barrel.

As depicted, a plurality of helicoid threads 201 which form helical projections and recesses are formed in the outer peripheral surface of the rear portion of the movable barrel 200, which is a barrel. A part of the helicoid threads 201 is formed with a pin 203. For example, the pin 203 is disposed at the upper part of the helicoid thread 201 so as to project upward.

The helicoid threads of fixed barrel will now be explained in detail.

Figure 4:
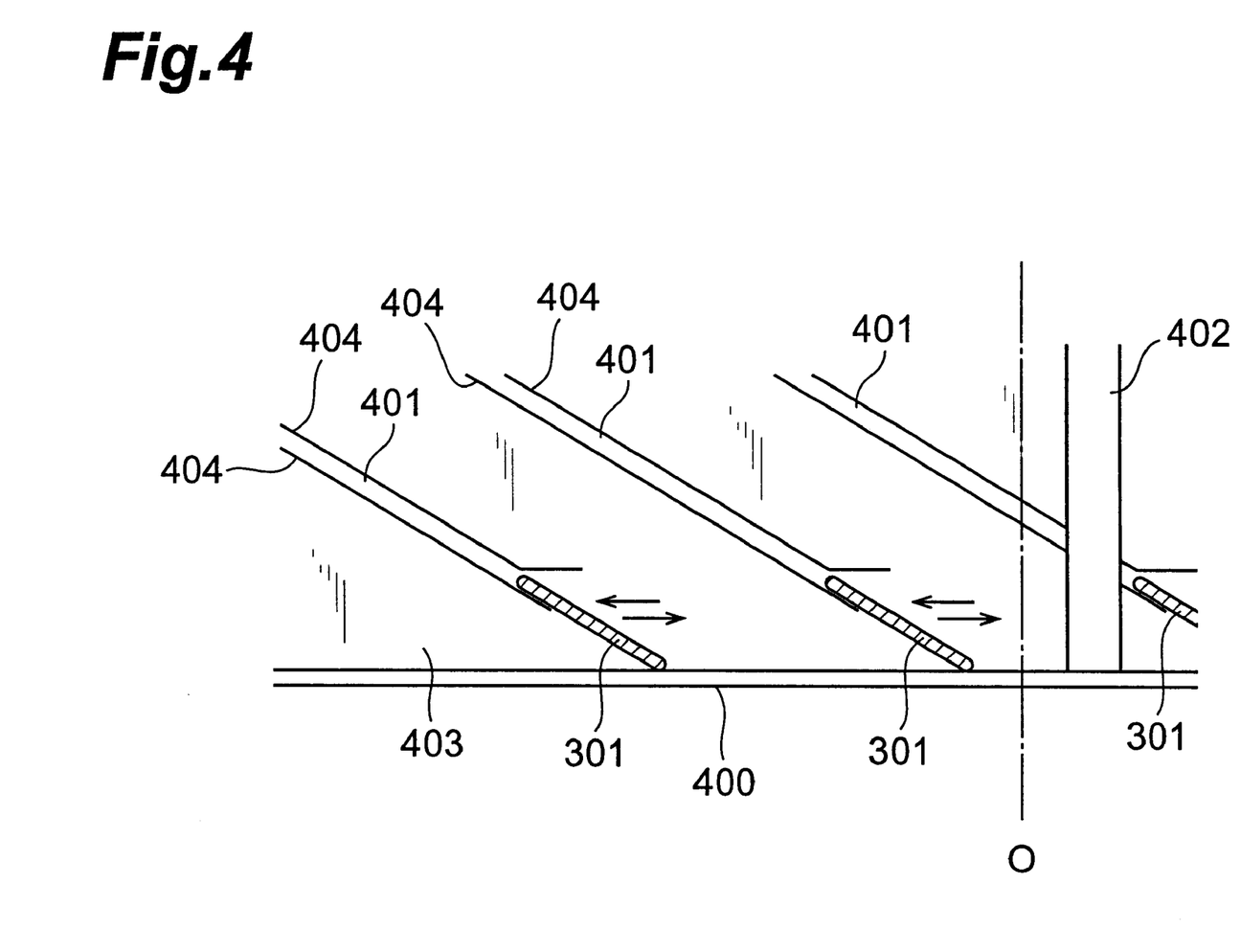
FIG. 4 is an explanatory view of the lens barrel of FIG. 2.

FIG. 4 is a view showing a part of the inner peripheral surface of the fixed barrel 400 in a developed state. As depicted, the inner peripheral surface 403 of fixed barrel 400 is formed with a number of helicoid threads 401 tilting with respect to the optical axis direction. In FIG. 4, the vertical direction is the optical axis direction. Each helicoid thread 401 has an elongated groove form, contains the helicoid thread 301 of intermediate barrel 300, and guides the intermediate barrel 300 in the optical axis direction as the intermediate barrel 300 rotates.

The helicoid thread 401 is formed between parallel projections 404, 404. At an end part of the helicoid thread 401, only the projection 404 on the front end side is formed orthogonal to the optical axis direction.

Hence, if the intermediate barrel 300 is collapsed into the fixed barrel 400, then the helicoid threads 301 come off their corresponding helicoid threads 401, whereby the intermediate barrel 300 can rotate without moving in the optical axis direction.

The cam grooves and helicoid threads of intermediate barrel will now be explained in detail.

Figure 5:
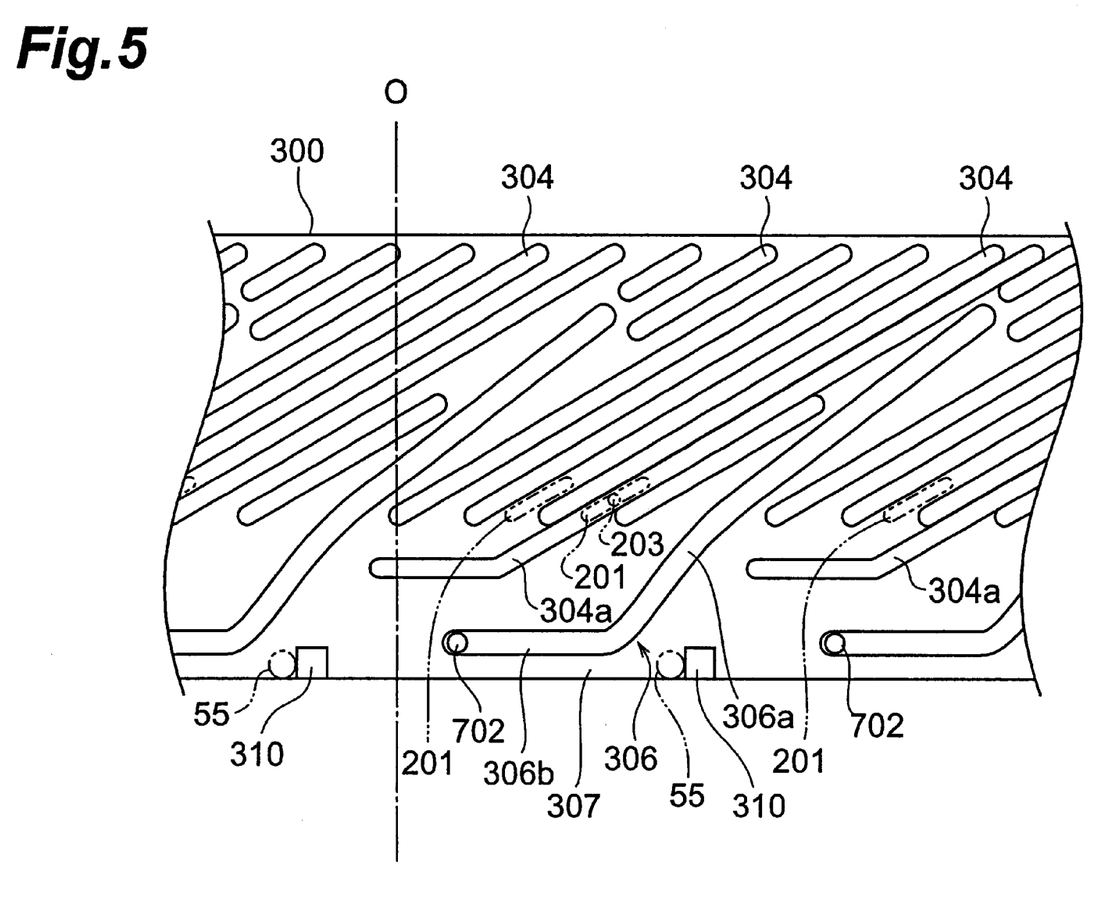
FIG. 5 is an explanatory view of the lens barrel of FIG. 2.

FIG. 5 is a view showing a part of the inner peripheral surface of intermediate barrel 300 in a developed state. As depicted, the inner peripheral surface 307 of intermediate barrel 300 is formed with a number of helicoid threads 304 tilting with respect to the direction of optical axis O, i.e., the optical axis direction. In FIG. 5, the vertical direction is the optical axis direction. Each helicoid thread 304 has an elongated groove form, accommodates its corresponding helicoid thread 201 of the movable barrel 200, and guides the movable barrel 200 in the optical axis direction.

Among the helicoid threads 304 formed in parallel, some helicoid threads 304a are formed deeper than the other helicoid threads 304 and formed longer toward the proximal end than the other helicoidal threads 304 are. On the proximal end side, the helicoid threads 304a are bent in a direction orthogonal to the optical axis direction.

Inserted into each helicoid thread 304a is the helicoid thread 201 having an upper portion formed with the pin 203. Due to the pin 203, the helicoid thread 201 is kept from coming off the deeply formed helicoid thread 304a.

The inner peripheral surface 307 is formed with cam grooves 306. Each cam groove 306 is used for guiding the movement of rear lens group 700 and contains therein the cam follower 702 of the rear group lens frame 701.

The cam groove 306 has a tilted region 306a formed substantially parallel to the helicoid thread 304 and an orthogonal region 306b formed continuous to the tilted region 306a on its proximal end side. The tilted region 306a is a region for moving the rear lens group 700 in the optical axis direction as the intermediate barrel 300 rotates. On the other hand, the orthogonal region 306b is a region formed orthogonal to the optical axis direction, which does not move the rear lens group 700 in the optical axis direction even when the intermediate barrel 300 rotates.

When the movable barrel 200 is collapsed in the intermediate barrel 300, the cam followers 702 of the rear group lens frame 701 are located in their corresponding orthogonal regions 306b of cam grooves 306, whereby the rear lens group 700 will not move relative to the intermediate barrel 300 even if the intermediate barrel 300 rotates.

The inner peripheral surface 307 is provided with lugs 310. Each lug 310 transmits the rotational force of intermediate barrel 300 to the ring member 5 by way of a projection 55, and is formed so as to project inward from the inner peripheral surface 307.

Actions of the barrier opening and closing apparatus in accordance with this embodiment will now be explained.

When the main switch of the camera body 800 is in its OFF state, as shown in FIG. 2, the intermediate barrel 300 is collapsed in the fixed barrel 400, whereas the movable barrel 200 is collapsed in the intermediate barrel 300. Here, the projection 55 of each rotational force transmitting part 52 is screwed by its corresponding lug 310 of the intermediate barrel 300 clockwise as viewed from the front side of the camera. Consequently, the ring member 5 is placed in a state rotated clockwise by means of the projections 55 and rotational force transmitting parts 52, whereby the barriers 2, 2 are closed by use of the coil springs 62.

If the main switch of camera is turned ON, then the intermediate barrel 300 rotates counterclockwise as viewed from the front side. Along with this rotation, the ring member 5 screwed into the intermediate barrel 300 by means of the projections 55 and rotational force transmitting parts 52 is allowed to rotate, whereby the ring member 5 rotates counterclockwise as the intermediate barrel 300 rotates. As the ring member 5 rotates, the barriers 2, 2 open.

Even when the intermediate barrel 300 rotates, if the rotation is at a predetermined level or lower, then the intermediate barrel 300 will not expand from the fixed barrel 400, and the movable barrel 200 will not expand from the intermediate barrel 300. Namely, even when the intermediate barrel 300 rotates, the intermediate barrel 300 will not expand from the fixed barrel 400 if the helicoid threads 301 of intermediate barrel 300 are not in mesh with the helicoid threads 401 of fixed barrel 400 as shown in FIG. 4. Even when the intermediate barrel 300 rotates, the movable barrel 200 will not expand from the intermediate barrel 300 if the pin 203 of movable barrel 200 is not located at the part of helicoid threads 304a orthogonal to the optical axis in the intermediate barrel 300 as shown in FIG. 5.

Therefore, as the intermediate barrel 300 rotates, the barriers 2, 2 can be opened without expanding the intermediate barrel 300 and movable barrel 200, whereby a picture can be taken at the WIDE end.

If a zooming operation is carried out by the camera body in this state, then the intermediate barrel 300 further rotates, so that the intermediate barrel 300 expands from the fixed barrel 400, and the movable barrel 200 expands from the intermediate barrel 300. As a consequence, telephotography can be performed. When ending the use of camera, the intermediate barrel 300 rotates in reverse according to an operation of the camera body 800, so that the intermediate barrel 300 is collapsed into the fixed barrel 400, and the movable barrel 200 is collapsed into the intermediate barrel 300.

Figure 6:
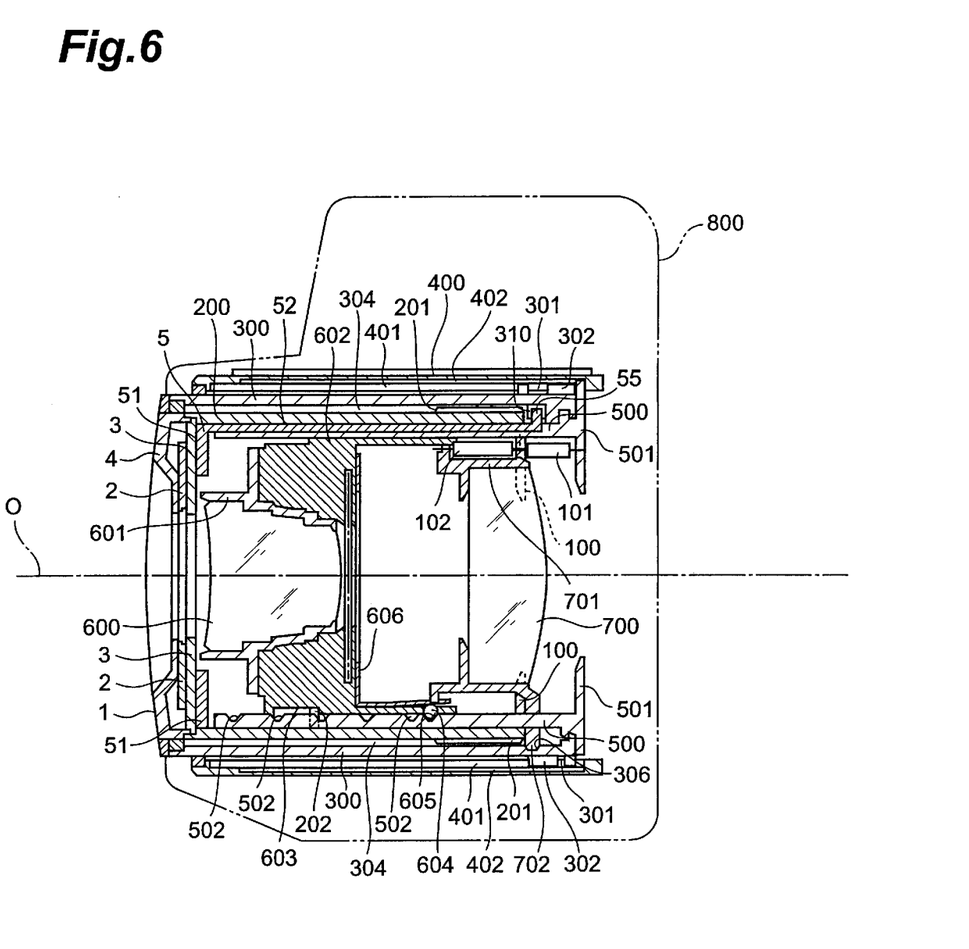
FIG. 6 is an explanatory view for actions of the barrier opening and closing apparatus of FIG. 1.

Then, when the intermediate barrel 300 is completely collapsed in the fixed barrel 400, and the movable barrel 200 is completely collapsed in the intermediate barrel 300 as shown in FIG. 6, only the intermediate barrel 300 is allowed to rotate without the intermediate barrel 300 and movable barrel 200 moving in the optical axis direction.

Here, the lugs 310 of intermediate barrel 300 abut against their corresponding projections 55, thereby screwing the projections 55 clockwise. As a consequence, the ring member 5 is rotated clockwise by way of the protrusions 55 and rotational force transmitting parts 52. As the ring member 5 rotates, the barriers 2, 2 are closed.

As in the foregoing, when the intermediate barrel 300, which is one member of the lens barrel, rotates in the barrier opening and closing apparatus 1 in accordance with this embodiment, its rotational force is directly transmitted to the ring member 5 byway of the rotational force transmitting parts 52. Therefore, it is not necessary for a component such as lever to be provided separately from the ring member 5 in order to rotate the ring member 5, whereby the number of components of the apparatus can be reduced. Hence, the cost for components can be cut down. Also, since the number of components can be reduced, the assembling at the time of making the apparatus becomes easier, whereby the manufacturing cost can be cut down.

Since the ring member 5 is provided with a plurality of rotational force transmitting parts 52, on the other hand, the rotational force of ring member 5 is transmitted by the plurality of rotational force transmitting parts 52, whereby the ring member 5 smoothly rotates without tilting as the rotational force is transmitted thereto. Consequently, the barrier can be opened and closed smoothly.

According to the present invention, as explained in the foregoing, a rotational force is directly transmitted to the ring member by way of rotational force transmitting parts as the lens barrel rotates or moves. Here, since the rotational force of ring member is transmitted by a plurality of rotational force transmitting members, the ring member smoothly rotates without tilting as the rotational force is transmitted thereto. As a consequence, the barrier can be opened and closed smoothly.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A barrier opening and closing apparatus for opening and closing a barrier according to action of a lens barrel containing an optical lens system said apparatus comprising a ring member rotatable about an optical axis of an optical lens system for opening and closing the barrier according to rotation of the ring member, said ring member including a plurality of rotational force transmitting parts extending rearward from said ring member, parallel to the optical axis, rotational force for opening and closing said barrier being supplied according to the action of lens barrel through said rotational force transmitting parts.

2. The barrier opening and closing apparatus according to claim 1, wherein said rotational force transmitting parts of said ring member engage the lens barrel, the rotational force being transmitted to said ring member through said rotational force transmitting parts as the lens barrel rotates.

3. The barrier opening and closing apparatus according to claim 1, wherein said rotational force transmitting parts are located at substantially equal intervals peripherally of said ring member.

4. The barrier opening and closing apparatus according to claim 1, wherein said rotational force transmitting parts engage the lens barrel at a rear end of the lens barrel.

5. The barrier opening and closing apparatus according to claim 1, wherein said ring member includes three of said rotational force transmitting parts.

6. The barrier opening and closing apparatus according to claim 1, wherein said apparatus is disposed in a camera.

* * * * *